C. LA DOW.

HORSE HAY-RAKE.

No. 7,407. Reissued Nov. 28, 1876.

Witnesses:

Louis F. Brous

A. P. Grant.

Inventor:

Chas. LaDow.

by John A. Wiedersheim

Attorney.

THE GRAPHIC CO. N.Y.

UNITED STATES PATENT OFFICE.

CHARLES LA DOW, OF ALBANY, NEW YORK.

IMPROVEMENT IN HORSE HAY-RAKES.

Specification forming part of Letters Patent No. 143,166, dated September 23, 1873; reissue No. 7,407, dated November 28, 1876; application filed July 15, 1876.

*To all whom it may concern:*

Be it known that I, CHARLES LA DOW, of the city and county of Albany and State of New York, formerly of South Galway, in the county of Saratoga and State of New York, have invented a new and useful Improvement in Hay-Rakes; and I do hereby declare the following to be a clear and exact description of the nature thereof, sufficient to enable others skilled in the art to which my invention appertains to fully understand, make, and use the same, reference being had to the accompanying drawings, making part of this specificatioin, in which—

Figure 1:
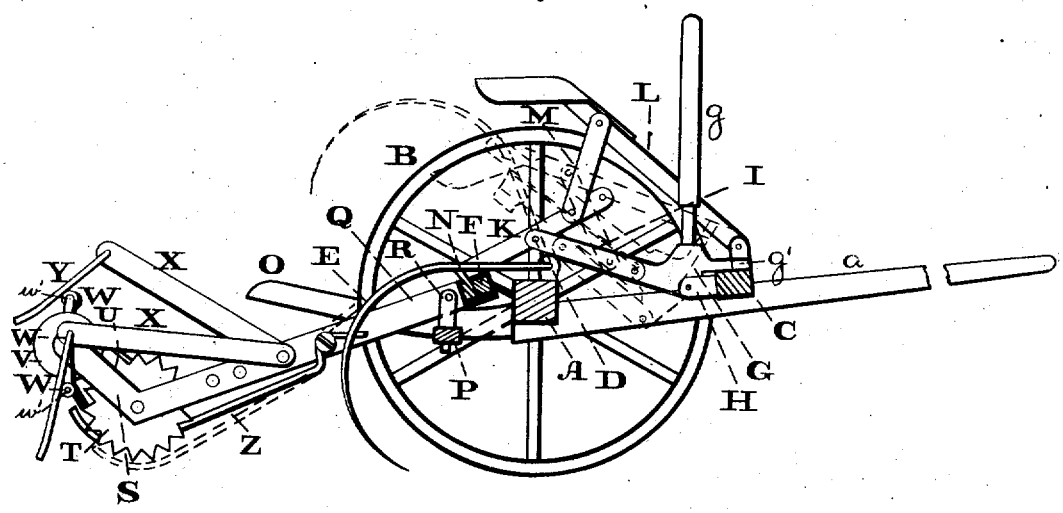
Figure 2:
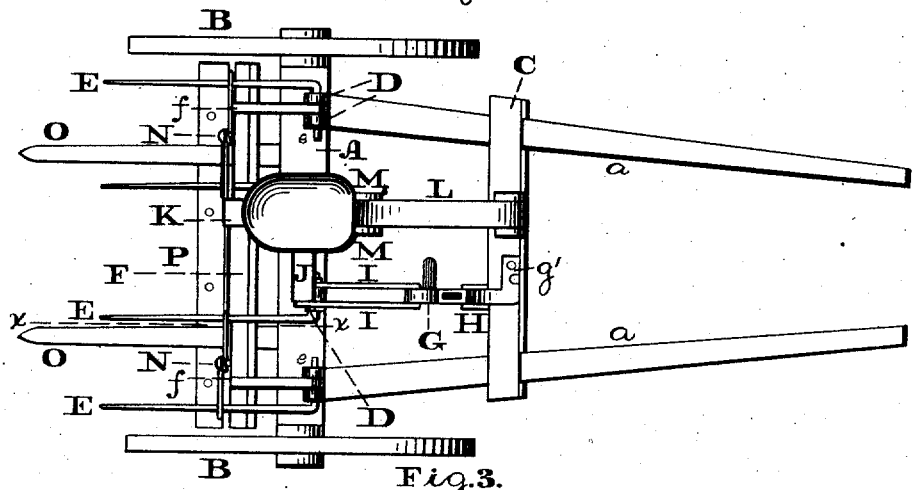
Figure 3:
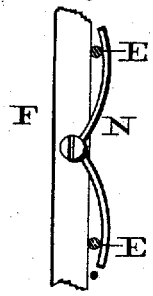

Figure 1 is a vertical section of the rake in line *x x*, Fig. 2, a tedder being attached thereto, but forming no part of the present invention. Fig. 2 is a top or plan view of the rake. Fig. 3 is a detached view, enlarged, of two teeth in section, the springs therefor, and connected bar.

Similar letters of reference indicate corresponding parts in the several figures.

The invention consists in constructing the rake-teeth with transverse bends, whereby the teeth have free hinge-motions, and are prevented from lateral play, the bends forming the axis of the elevating cross-bar of the teeth. It also consists of the combination of parts to form an improvement in rakes.

Referring to the drawings, A represents the axle, B the wheels, and *a* the shafts, on which is supported a cross-bar, C. E represents the rake-teeth, each of whose upper ends is bent transversely, so that it stands at or about a right angle to the body of the tooth, and said angular ends have their bearings on the axle A. D represents eyes, which are secured to the axle A, and in them may be inserted the angular ends of the rake-teeth, and to said eyes are pivoted longitudinally-extending straps *f*, which are also secured to a cross-bar, F, on which rest the adjacent portions of the rake-teeth. To the bar C there is hinged a lever, G, which may be provided with a socket for receiving the hand-lever *g*, and to said lever there are pivoted rods or straps I, which extend longitudinally, and are connected to a yoke, J, secured to the axle A. K represents an arm, whose rear end is connected to the cross-bar F. The front end is connected by means of rods M to the bar L of the driver's seat, and intermediate of its ends it is secured to the yoke J. A series of openings is made in the arm K, so as to alter the connection with the bar L, and thus adjust the weight of the driver to the work. To the bar F there are attached curved springs N, which are so arranged as to bear upon and keep in position simultaneously two rake-teeth, and likewise allow each tooth to have an independent movement in passing over obstructions, besides forming shoulders or stops, against which the teeth strike when raised to their proper height. This construction, while it permits the teeth to rise sufficiently to pass over ordinary obstructions, prevents their being raised to an unnecessary height, and secures each of them from being thrown out from under its spring. O represents the clearer-bars, the use of which is well known. The joints of the lever G, rods I, and yoke should be so disposed that when the teeth are down the weight of the teeth and connected parts will in a measure rest on a foot-piece, *g'*, of the lever G, bearing upon the cross-bar C.

The operation is as follows: The lever G will be forced downward by means of hand or foot until the joints of the lever G and rods I are thrown out of line, said lever G and rods I, in their normal position, controlling the yoke J, and consequently the elevating-bar of the teeth. The yoke is now in such position that the weight of the driver is brought to bear on the arm K, whereby the arm F will be elevated, and with it the rake-teeth, the hay being thereby dumped. In order to return the teeth and seat, the lever G will be operated in a reverse direction to that stated, whereby the several parts will resume their normal position. By means of the angular ends of the rake-teeth, the teeth have free hinged motions, and their bearings are such that the teeth are prevented from lateral play. The angular ends of the teeth also form the axis for the elevating cross-bar F, whereby, during the elevation of the teeth, there will be no friction between said bar and the teeth, and thus the latter will be elevated with ease.

Having thus described my invention, what I claim as new, and desire to secure by Letters Patent, is—

1. The rake-teeth having their upper ends bent transversely, as at *e*, in combination with the elevating cross-bar F, having its axis on said bends *e*, substantially as and for the purpose set forth.

2. The combination of yoke J, arm K, cross-bar F and its attached straps, hinged to the axle A by the bearing D D, and the right-angled ends *e e* of the rake-teeth E E, with the seat-bar L, lever G, rods I I and M, when constructed and operating substantially as and for the purpose set forth.

CHARLES LA DOW.

Witnesses:
JOHN HIGGINS,
JAMES MCGUIRE.